C. P. SKUBLIN.
TROLLEY WHEEL.
APPLICATION FILED JUNE 19, 1919.
1,349,230.
Patented Aug. 10, 1920.
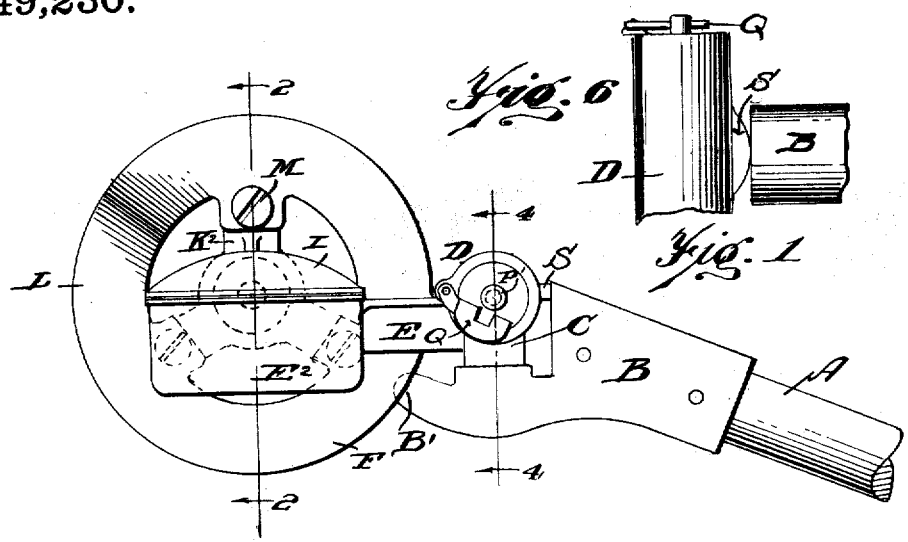
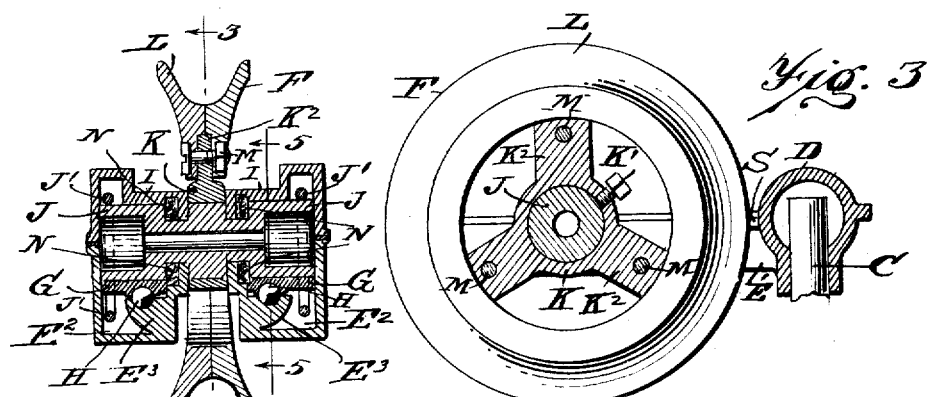
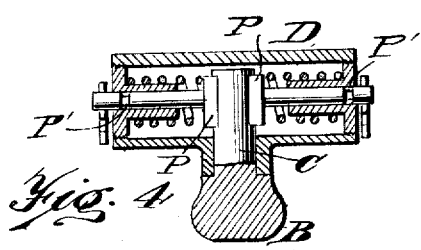
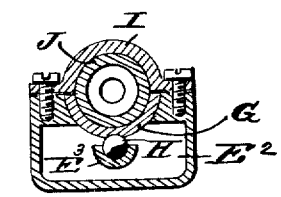
Inventor
Charles P. Skublin
By S. E. Thomas
Attorney

UNITED STATES PATENT OFFICE.

CHARLES P. SKUBLIN, OF DETROIT, MICHIGAN, ASSIGNOR TO WILLIAM A. ADAMS, OF DETROIT, MICHIGAN.

TROLLEY-WHEEL.

1,349,230.

Specification of Letters Patent.  Patented Aug. 10, 1920.

Application filed June 19, 1919. Serial No. 305,232.

*To all whom it may concern:*

Be it known that I, CHARLES P. SKUBLIN, citizen of Russia, residing at Detroit, county of Wayne, State of Michigan, have invented a certain new and useful Improvement in Trolley-Wheels, and declare the following to be a full, clear, and exact description of the same, such as will enable others skilled in the art to which it pertains to make and use the same, reference being had to the accompanying drawings, which form a part of this specification.

My invention relates to trolley wheels, for electric railways, to be stored upon the car for attachment to the trolley pole when required.

One object of the invention is to provide means adapted to permit the wheel to flex when rounding curves but which serves to return the wheel to its normal position upon the wheel passing from a "turn out" or curved position to a straight trolley line.

Another feature of the invention is the means for securing the wheel supporting fitting to the trolley pole and for releasing the same.

Another feature of the invention is the means for lubricating the wheel bearings.

Another object is an improvement in the general construction of the device.

Another feature of the invention is the divided trolley wheel, the sections being secured to the hub which has projecting trunnions forming a long bearing surface adapted to reduce the wear and to provide for the ready lubrication of the device.

With the foregoing and other objects in view which will appear as the description proceeds, the invention resides in the combination and arrangement of parts and in the details of construction hereinafter described and claimed, it being understood that changes may be made in the precise embodiment of the invention herein disclosed without departing from the spirit of the same.

In the drawings accompanying this specification:—

Figure 1 is a side elevation of the device mounted upon the end of a trolley pole.

Fig. 2 is a cross-sectional view on line 2—2 of Fig. 1.

Fig. 3 is a vertical longitudinal sectional view on line 3—3 of Fig. 2.

Fig. 4 is a cross-sectional view on line 4—4 of Fig. 1.

Fig. 5 is a cross-sectional view on line 5—5 of Fig. 3.

Fig. 6 is a detail view of a portion of the bracket carried on the end of the trolley pole, showing the fitting and its arc-shaped lug bearing against the bracket to provide for a limited rocking movement of the fitting.

Referring now to the letters of reference placed upon the drawings:—

A denotes a trolley pole. B, a bracket secured to the end of the pole, having an upstanding pintle C, on which the trolley wheel fitting D, turns to adjust itself to the curves of the trolley line.

The fitting D, includes a pair of arms E, E', integral therewith spaced apart to receive the trolley wheel F, the arms at their outer ends terminating in a pair of oil wells $E^2$, $E^2$, in which are mounted bearings G. $E^3$, are lugs projecting from the inner side wall of the oil wells, recessed to receive a ball H, which latter projects into a recess in the bottom of the bearings G, to secure the bearings against lateral displacement. I, indicates a cover for the respective oil wells which serves also as one half of the bearing for the axle J. J', are rings suspended from the ends of the axle J, into the oil wells to deliver oil to the bearings as the axle rotates. To the axle J, is secured a hub K, by means of the set screw K'. $K^2$, are spokes integral with the hub. L, is the grooved rim of a divided trolley wheel secured by bolts M, to the ends of the spokes.

N, N, are gaskets lodged in recesses provided on each side of the trolley wheel, between the axle J, the wall of the oil wells, and the covers of the latter.

The fitting D, has a transverse chamber in which is lodged opposing spring actuated plungers P, P, adapted to bear against two flattened faces respectively formed on opposite sides of the upstanding pintle, the action of which serves to normally maintain the trolley wheel parallel with the pole.

Adjacent to the projecting end of each plunger rod is formed a peripheral groove P', to receive swinging latches Q, pivoted to the fitting at each end thereof to maintain the plungers in released relation to the pintle when it is desired to remove the fitting and its trolley wheel from the trolley pole bracket.

To remove the fitting, the latter is first manually turned upon the pintle, thereby causing the plungers to move from the flattened faces of the pintle to the rounded portion of the latter, with the peripheral grooves of the plunger in position to receive the swinging latches Q;—the latter are then forced into the peripheral grooves to hold the plunger rods in an "open" or released relation to the pintle, so that upon again swinging the fitting back to normal position, it may be removed from the supporting bracket.

At the back of the fitting is an arc-shaped lug S, integral therewith and bearing upon the upstanding wall of the supporting bracket, the purpose of which is to provide for a limited rocking movement of the fitting with respect to the bracket. To further limit the swinging movement of the trolley wheel and its supporting fitting, the bracket B, is provided with a projecting end or "horn" B', extending into the groove of the trolley wheel, which it is obvious will serve to limit the swinging action of the trolley wheel. The horn B', also serves a further purpose in guarding against accidental entry of the trolley line between the fitting and bracket in the event of the displacement of the trolley pole.

Having thus described my invention, what I claim is:—

1. In a device of the character described, a trolley wheel, a removable fitting in which the trolley wheel is journaled, a bracket adapted for attachment to the end of a trolley pole, having an upstanding pintle with opposite flattened faces, and a pair of opposing spring actuated plungers supported in the fitting adapted to bear upon the flattened sides of the pintle to yieldingly maintain the trolley wheel in alinement with the trolley pole.

2. In a device of the character described, a trolley wheel, a movable fitting in which the trolley wheel is journaled, a bracket adapted for attachment to the end of a trolley pole, having an upstanding pintle with flattened faces on opposite sides of said pintle to receive the thrust of spring actuated plungers, a pair of opposing spring actuated plungers housed in the fitting adapted to bear upon the flattened sides of the pintle to yieldingly maintain the trolley wheel in alinement with the trolley pole, and means for holding said plungers in released relation to the flattened sides of the pintle, whereby the fitting with its trolley wheel may be detached from the bracket.

3. In a device of the character described, a trolley wheel, a movable fitting in which the trolley wheel is journaled, a bracket adapted for attachment to the end of the trolley pole, having an upstanding pintle provided with flattened faces on opposite sides thereof, a pair of opposing plungers adapted to bear upon said flattened sides, springs adapted to force said plungers in contact with the flattened sides of the pintle, and latches adapted to engage the plunger rods, whereby the plungers may be held in released relation to the flattened sides of the pintle.

4. In a device of the character described, a trolley wheel, an axle extending through the wheel, a hub secured to the axle having radiating spokes, a rim divided centrally between its flanges with its opposing faces abutting to form a tread overlapping the spokes to receive the wear of the trolley line, bolts for securing the divided portions of the rim to the ends of the spokes, and means adapted to be carried by the trolley pole for supporting the trolley wheel.

5. In a device of the character described, a rocking fitting provided with a pair of oil wells spaced apart, a trolley wheel, an axle secured to and extending through the trolley wheel, bearings for said axle recessed below to receive a ball, lugs projecting from the walls of the oil well recessed to receive a ball, a ball lodged in the recesses of the respective lugs and bearings, to secure the bearings against displacement, a cover for said oil wells adapted to form the upper half of the axle bearings, loose rings supported on the ends of the axle adapted to convey oil from the oil wells to the bearings, and a bracket for supporting the fitting upon a trolley pole.

6. In a device of the character described, a rocking fitting, a divided trolley wheel, an axle extending through the wheel, a hub secured to the axle having radiating spokes, bolts for securing the divided portions of the trolley wheel to the ends of the spokes, a bracket adapted to be secured to a trolley pole having an upstanding pintle on which the fitting is mounted and having also a projecting horn extending into the groove of the trolley wheel, whereby the tilting action of the fitting is limited and the trolley wheel protected against accidental lateral entry of the trolley line between the wheel and bracket.

In testimony whereof I sign this specification in the presence of two witnesses.

CHARLES P. SKUBLIN.

Witnesses:
S. E. THOMAS,
JOHN CONSIDINE, Jr.